United States Patent [19]
Fujioka et al.

[11] Patent Number: 5,551,857
[45] Date of Patent: Sep. 3, 1996

[54] CYLINDER TEMPERATURE CONTROLLER FOR AN INJECTION MOLDING MACHINE

[75] Inventors: Osamu Fujioka; Tokuhisa Miyauchi; Noriaki Neko, all of Yamanashi, Japan

[73] Assignee: Fanuc Ltd., Minamitsuru-gun, Japan

[21] Appl. No.: 332,810

[22] Filed: Nov. 2, 1994

[30] Foreign Application Priority Data

Nov. 8, 1993 [JP] Japan ................... 5-300851

[51] Int. Cl.⁶ ................... B29C 45/78
[52] U.S. Cl. ................... 425/143; 264/40.6; 425/144
[58] Field of Search ................... 425/143, 144; 264/40.6

[56] References Cited

U.S. PATENT DOCUMENTS

| 3,870,445 | 3/1975 | Hold et al. | 425/144 |
| 5,272,644 | 12/1993 | Katsumata et al. | 425/143 |

FOREIGN PATENT DOCUMENTS 4-54912  2/1992  Japan .

*Primary Examiner*—Tim Heitbrink
*Attorney, Agent, or Firm*—Staas & Halsey

[57] ABSTRACT

A cylinder temperature controller for an injection molding machine in which an injection molding operation is performed while keeping the injection cylinder at a stable preset temperature regardless of disturbances such as the change of mold temperature or ambient temperature and the temperature rise caused by the shear compression of resin. A temperature regulator for carrying out PID feedback control of the injection cylinder temperature is provided with a PID adjusting means unit for automatic tuning. The actual temperature T of each portion of the injection cylinder is detected by a thermocouple. When the actual temperature T deviates from a predetermined temperature range defined by an upper limit [A+B] and lower limit [A−B] which are set on the basis of the preset target temperature A, an automatic tuning command is outputted to the temperature regulator. Upon receipt of this command, the PID adjusting unit sets the PID parameters again at a value suitable to the disturbance. By keeping the PID parameters to be suitable to the disturbance, the actual temperature T of each portion of the cylinder agrees with the preset target temperature A regardless of the change of the disturbance.

5 Claims, 2 Drawing Sheets

5,551,857

CYLINDER TEMPERATURE CONTROLLER FOR AN INJECTION MOLDING MACHINE

BACKGROUND OF THE INVENTION

1. Field of the invention

The present invention relates to a controller for controlling the temperature of an injection cylinder in an injection molding machine.

2. Description of the Related Art

There is known an injection molding machine having a temperature regulator for regulating the temperature of an injection cylinder by PID feedback control. The temperature regulator carries out P (proportional), I (integral) and D (differential) control to regulate the calorific value of a heater for heating the injection cylinder so that the cylinder temperature agrees with the preset value. The parameter values used for this PID feedback control are set in advance before the injection molding operation is started. For the conventional temperature regulator for an injection molding machine, the PID parameter values set in advance cannot be changed during the operation of the injection molding machine. Therefore, if the setting of the PID parameters becomes improper due to a disturbance such as a change of molding temperature or ambient temperature during the operation of the injection molding machine, the PID parameter value must be set again by interrupting the injection molding operation. This delays the molding operation.

If the preset value of a PID parameter becomes markedly improper due to a disturbance, there occurs a great difference between the actual cylinder temperature and the preset cylinder temperature for a long period of time despite the fact that the feedback control itself functions normally. Therefore, molding defects such as short shot, burning, and sink mark are produced, by which a normal injection molding operation sometimes becomes impossible.

Also, it is difficult to determine the PID parameter by predicting the temperature rise, etc., caused by the shear compression of resin when it is measured and mixed, before starting a molding operation. Therefore, the PID parameter value set before the start of the injection molding operation cannot be guaranteed to be always proper for the actual injection molding operation.

SUMMARY OF THE INVENTION

The present invention provides a temperature controller for an injection molding machine which performs an injection molding operation while keeping the injection cylinder at a stable preset temperature regardless of disturbances such as a change of mold temperature or ambient temperature and the temperature rise caused by the shear compression of resin.

The temperature controller for an injection molding machine in accordance with the present invention includes a heater for heating the injection cylinder; temperature detecting means for detecting the temperature of the injection cylinder; a temperature regulator for regulating the calorific value of the heater by carrying out PID feedback control using PID parameters so that the detected cylinder temperature agrees with a preset value; command outputting means for outputting an automatic tuning command when the detected cylinder temperature deviates from a temperature range defined by predetermined upper and lower limits; and PID parameter adjusting means, which is provided on the temperature regulator, for automatically tuning the PID parameters in response to the automatic tuning command from the command outputting means.

By keeping the PID parameter used for PID feedback control at a value suitable to the disturbance, control is carried out so that the actual temperature of each portion of the cylinder agrees with the preset target temperature regardless of the change of disturbance.

DETAIL OF DESCRIPTION OF THE PREFERRED EMBODIMENT

Figure 1:
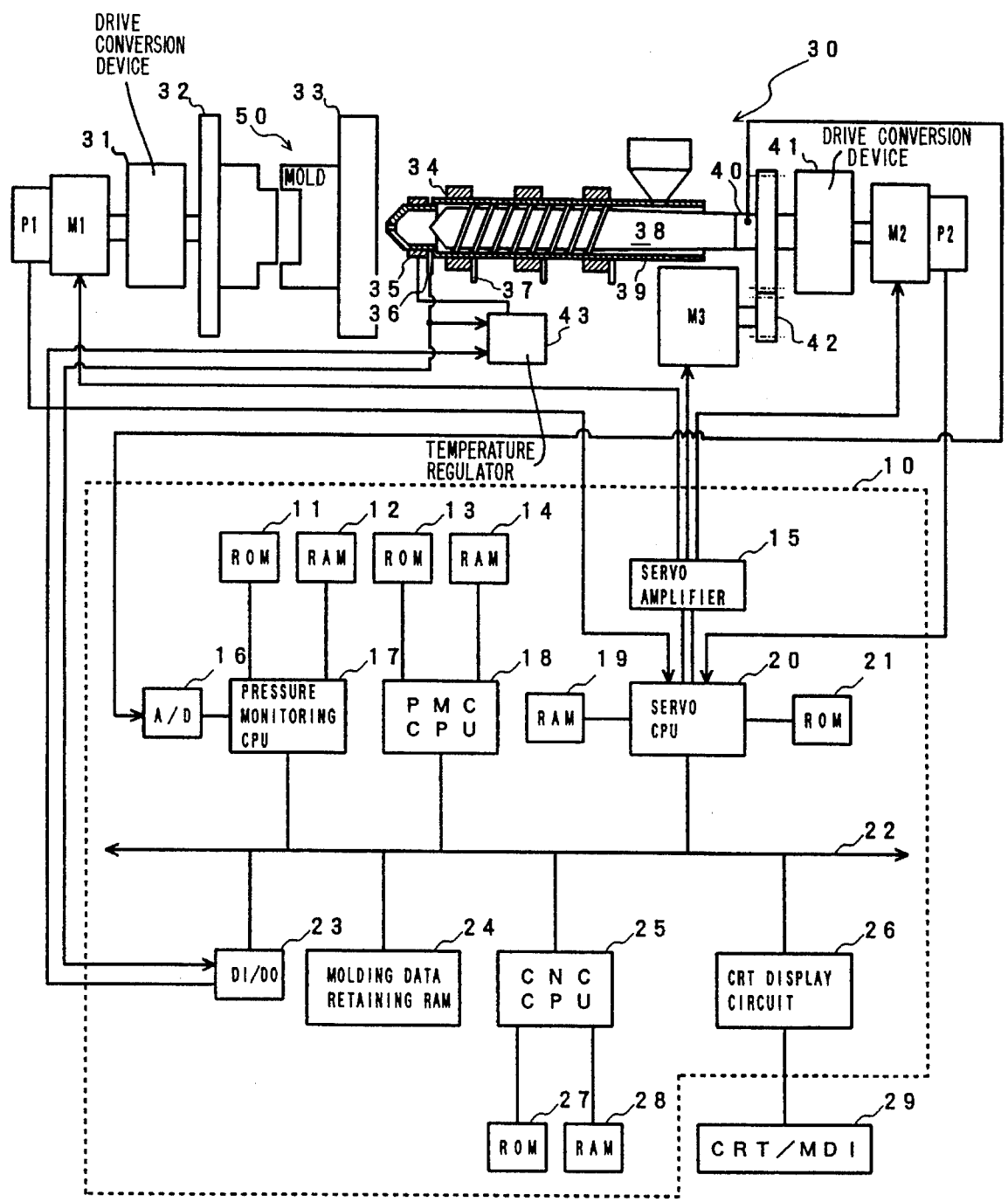
FIG. 1 is a block diagram of a cylinder temperature controller and the principal portion of an injection molding machine in accordance with an embodiment of the present invention.

Referring to FIG. 1, an injection cylinder 39 of an injection molding machine is provided with band heaters 34 and a thermocouples 37 as a temperature detecting means. A plurality of sets each having a band heater 34 and a thermocouple 37 are arranged longitudinally to individually control the temperature of each portion of the injection cylinder 39. A band heater 35 and a thermocouple 36 are also provided at the nozzle portion of the tip end of the injection cylinder 39. Each temperature regulator 43 is associated with a set of the band heater 35 and the thermocouple 36. In FIG. 1 there is shown only one temperature regulator 43 for carrying out PID control of the temperature of the nozzle portion. However, a similar temperature regulator 43 is individually disposed for each set of the band heater 34 and the thermocouple 37 at each portion of the injection cylinder 39.

A movable platen 32 is driven by a servomotor M1 for mold clamping via a drive conversion device 31 including a ball screw/ball nut, a toggle mechanism, etc., and is moved along a tie bar (not shown). A screw 38 is driven by a servomotor M2 for injection via a drive conversion device 41 including a ball screw/ball nut, a boss/serration, etc., and is moved in the axial direction. The screw 38 is also driven by a servomotor M3 for measuring via a gear mechanism 42, and is rotated for measuring and mixing resin independently of the axial movement. A mold 50 is mounted between a stationary platen 33 and the movable platen 32.

A controller 10 includes a CPU 25 for CNC, which is a microprocessor for numerical control, a CPU 18 for PMC, which is a microprocessor for a programmable machine controller, a servo CPU 20, which is a microprocessor for servo control, and a CPU 17 for pressure monitoring, which performs sampling of injection dwell pressure or screw back pressure. Information is transmitted between the microprocessors via a bus 22 by selecting the mutual input and output.

The CPU 18 for PMC controls the sequence operation of the injection molding machine. The CPU 18 is connected to a ROM 13 for storing the sequence program etc., and to a RAM 14 used for temporary storage of arithmetic data. The CPU 25 for CNC is connected to a ROM 27 for storing a program generally controlling the injection molding machine, and to a RAM 28 used for temporary storage of arithmetic data.

The servo CPU 20 is connected to a ROM 21 for storing a control program dedicated to servo control, and to a RAM 19 used for temporary storage of data. The CPU 17 for pressure monitoring is connected to a ROM 11 storing a control program concerning the sampling of molding data, and to a RAM 12 used for temporary storage of data.

The servo CPU 20 is also connected to a servo amplifier 15 which drives, on the basis of the command from the CPU 20, the servomotor of each axis for an ejector (not shown), mold clamping, injection, screw rotation, etc. The outputs from a pulse coder P1 disposed on the servomotor M1 for mold clamping, and the outputs from a pulse coder P2 disposed on the servomotor M2 for injection, etc. are fed back to the servo CPU 20. The current position of the movable platen 32 computed by the servo CPU 20 on the basis of the feedback pulse from the pulse coder P1, the current position and the current speed of the screw 38 computed on the basis of the feedback pulse from the pulse coder P2, etc., are stored in the current position storing register and the current speed storing register in the RAM 19.

The CPU 17 for pressure monitoring performs sampling of injection dwell pressure and screw back pressure via a pressure detector 40, which is provided at the proximal end of the screw 38, and an A/D converter 16.

A nonvolatile memory 24 for retaining molding data stores the molding conditions regarding the injection molding operation (injection pressure holding condition, measuring condition, etc.), and various set values, parameters, macro variables, etc. In this embodiment, a predetermined temperature range for determining whether or not automatic tuning is performed is set for each temperature regulator 43 and stored in the nonvolatile memory 24. This temperature range is defined by the upper and lower limits having a tolerance value B above and below the preset target temperature A of each portion of the cylinder.

A manual data input device (MDI) 29 with a display (CRT) is connected to the bus 22 via a CRT display circuit 26. The CRT/MDI 29 is used for the display of various preset screens, the input operation of data, etc., in accordance with the operation of various function keys, numeric keys, cursor movement keys, etc.

The CPU 18 for PMC carries out the sequence control for each axis of the injection molding machine, and the CPU 25 for CNC carries out pulse distribution for servomotors of each axis on the basis of the control program of the ROM 27. The servo CPU 20 performs digital servo control such as position loop control, speed loop control, and current loop control, in the similar way as the conventional method, on the basis of the movement command distributed for each axis, and the position and speed feedback signals detected by the detector of the pulse coder P1, P2, etc.

The temperature control of each portion of the injection cylinder 39 by regulating the calorific value of the band heaters 34 and 35 is carried out in the similar way as the conventional method by the PID feedback control. The PID feedback control is performed by each temperature regulator 43 on the basis of the relationship between the actual temperature of each portion of the injection cylinder 39 fed back by the thermocouple 38, 37 for each portion and the preset target temperature set in the nonvolatile memory 24 for each temperature regulator 43 in accordance with the commands from the CPU 18 via the input/output circuit 23. The actual temperature of each portion of the injection cylinder 39, which is detected by the thermocouples 36 and 37, is read by the CPU 18 for PMC via an input/output circuit 23.

Each of the temperature regulators 43 has an automatic tuning function for automatically tuning the parameter values of each operation of P (proportional), I (integral) and D (differential). This function is automatically activated by the automatic tuning command provided by the CPU 18 for PMC as a command output means, via the input/output circuit 23.

Any automatic tuning method may be adopted for the temperature regulator 43. For example, the step response method, to which the regulation rule proposed by Ziegler and Nichols is applied, can be adopted. According to this method, the preset value is automatically determined by the maximum value of inclination of response waveform detected at the rise time of 100% manipulated variable or at the fall time of 0%. Therefore, in the execution of automatic tuning, there is no processing which should be performed by the CPU 18 for PMC. The CPU 18 for PMC merely outputs the automatic tuning command to each temperature regulator 43. The aforementioned regulation rule proposed by Ziegler and Nichols is described in detail in, for example, "Trans. ASME, Optimum Settings for Automatic Controllers, Vol. 64, (1942) and "Trans. ASME, Process Lags in Automatic Control Circuits", Vol. 64, (1943). The step response method to which this regulation rule is applied is described in detail in, for example, "Practical Use Handbook for Temperature and Humidity Sensors, an extra issue of Transistor Gijutsu", published by CQ publishing Inc. on Jan. 1, 1988 in Japan.

Figure 2:
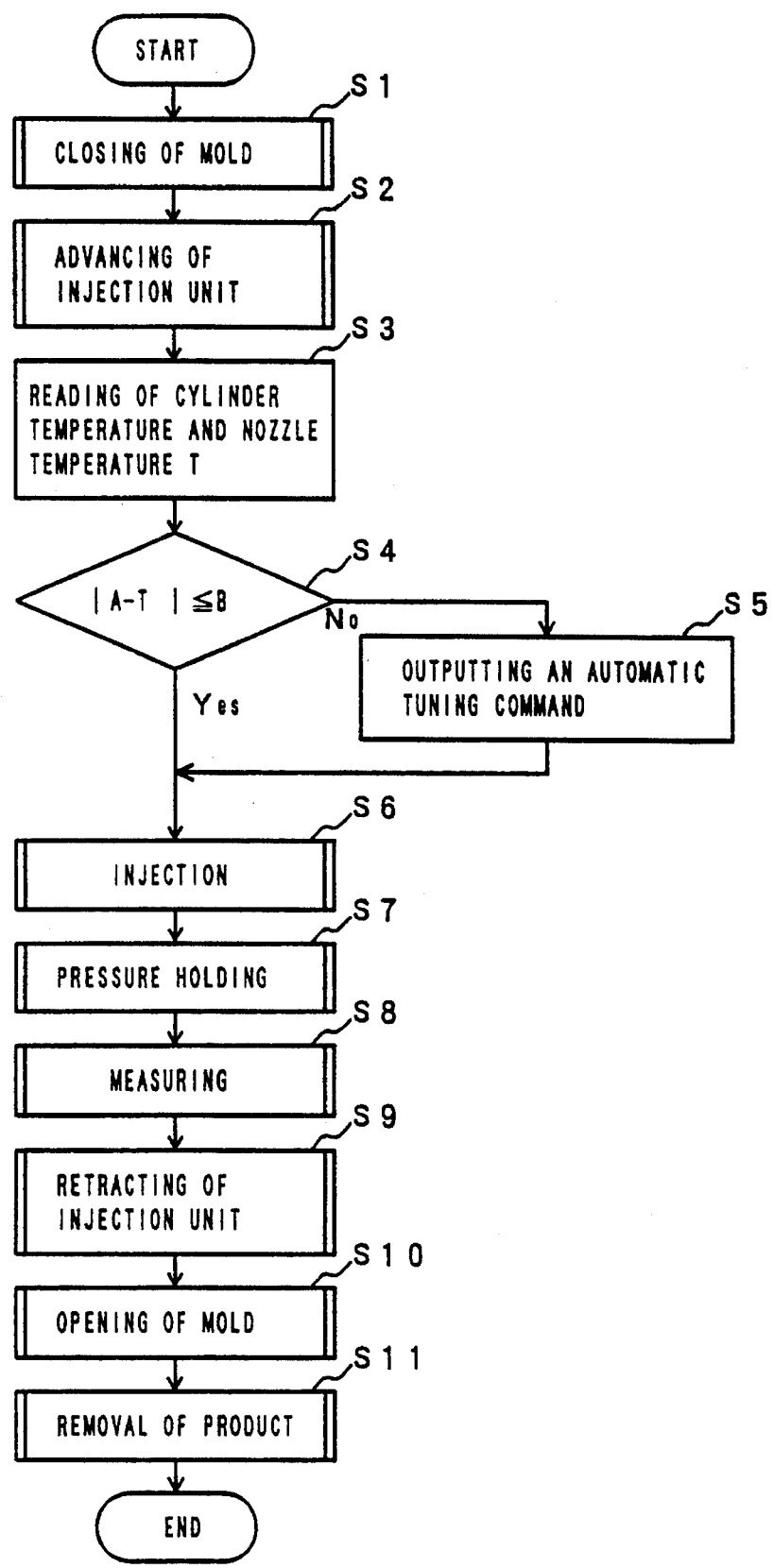
FIG. 2 is a flowchart showing the outline of sequence control using the cylinder temperature controller shown in FIG. 1.

FIG. 2 is a flowchart showing the outline of the sequence control carried out by the CPU 18 for PMC for one molding cycle. The temperature control of the injection cylinder 39 in this embodiment will be described, assuming that each portion of the injection cylinder 39 has been heated to a temperature at which molding is possible, by the band heaters 34 and 35, and a continuous molding operation has been started.

The CPU 18 for PMC, which has started the sequence control of one molding cycle, first outputs the mold closing command to the CPU 25 for CNC, and drives the servomotor M1 for clamping to perform mold closing and mold clamping processes, which is the same as the conventional method (Step S1). Thereafter, a motor for sprue break (not shown) is driven to advance the injection cylinder 39 and to a perform nozzle touch operation, which is the same as the conventional method (Step S2). The nozzle touch operation is performed only when the sprue break operation is set as the molding condition, but is not performed in other cases. When the injecting operation is performed continuously, the nozzle is kept in contact with the sprue.

Next, the CPU 18 for PMC individually reads the cylinder temperature of each portion from the thermocouples 36 and 37 disposed at the nozzle and each portion of the injection cylinder 39 via the input/output circuit 23 (Step S3). Then, the CPU 18 for PMC determines whether or not the difference between the preset target temperature A of each portion of the cylinder set in the nonvolatile memory 24 as the molding condition and the actual temperature T of each portion of the cylinder exceeds the tolerance value B, that is, whether or not the actual temperature T of each portion of the cylinder deviates from the predetermined range (Step S4). If the difference between the preset target temperature A and the actual temperature T is larger than the tolerance value B and any one of temperature regulators 43 which should perform automatic tuning is detected, the CPU 18 for PMC outputs the automatic tuning command to that temperature regulator 43 via the input/output circuit 23 (Step S5) to make the temperature regulator 43 perform automatic tuning processing, so that a renewed PID parameter suitable for a changed disturbance is set to carry out PID feedback control. When there is not any temperature regulator 43 which is to perform automatic tuning and the judgment result of Step S4 is YES, the PID parameter values which have been set so far are regarded as being proper, the processing of Step S5 is not executed, and the PID feedback control based on the current value of the PID parameters is carried out continuously as it is.

Next, the CPU 18 for PMC outputs the injection command to the CPU 25 for CNC to drive the servomotor M2 for injection, so that the injection and pressure holding processes, which are the same as the conventional method, are performed (Steps S6 and S7). Then the CPU 25 commands the servomotor M3 to rotate the screw 38 while a predetermined back pressure is applied to resin by the servomotor M2 for injection. Thus, the measuring and mixing operation, which is the same as the conventional method, is performed (Step S8). Thereafter, the motor for sprue break (not shown) is driven to retract the injection cylinder 39. Thus, the sprue break operation, which is the same as the conventional method, is performed (Step S9). The sprue break operation is performed only when such operation has been set as the molding condition, but is not performed in other cases.

After the sprue break operation or the measuring process is completed, the CPU 18 outputs the mold opening command to the CPU 25 to drive the servomotor M1 for clamping mold, so that the mold opening process, which is the same as the conventional method, is started (Step S10). Then the CPU 25 drives the servomotor for ejector in association with the mold opening operation to perform the mold release operation of the product (Step S11). Thus, all of the sequence control in one molding cycle are completed.

Thereafter, the CPU 18 for PMC waits for the mold opening completion command from the CPU 25 for CNC, and executes the above processing repeatedly.

During the period when automatic operation is continuously performed, the cylinder temperature T of each portion is successively detected by the thermocouple 36, 37 of each portion of the injection cylinder 39 including the nozzle for each molding cycle, and whether the difference between the preset target temperature A of each portion of the cylinder and the actual temperature T of each portion of the cylinder exceeds the tolerance value B is determined. If the actual temperature T changes from the preset target temperature A over the tolerance B, the current values of the PID parameters which have been set in the temperature regulator 43 are regarded as being improper as the value compensate for the disturbance acting at the present time. To correct this, the PID parameter values are automatically set again, so that the temperature of each portion of the injection cylinder 39 is stably kept at the preset target temperature regardless of the changing condition of disturbance. By the method of setting the PID parameters using the step response method, the PID parameters at the rise time and the PID parameters at the steady time are calculated individually, so that inadvertent overshoot at the rise time is prevented, and quick response to the change of disturbance is obtained.

According to the cylinder temperature controller of the present invention, any manual setting operation which requires interruption of the injection molding operation is not necessary for making the PID parameters proper, so that continuous molding operation is performed. Also, the injection molding operation is performed while keeping the injection cylinder at the preset temperature regardless of the disturbance such as the change of mold temperature or ambient temperature and the rise in temperature caused by the shear compression of resin. Thus, the occurrence of molding defects such as short shot, burning, and sink mark are prevented.

What is claimed is:

1. A temperature controller for an injection molding machine having an injection cylinder and at least one injection molding cycle, the temperature controller comprising:

a heater for heating said injection cylinder;

temperature detecting means for detecting an actual cylinder temperature of said injection cylinder;

a temperature regulator for regulating a calorific value of said heater by carrying out proportional, integral and differential (PID) feedback control using PID parameters so that the cylinder temperature detected by said temperature detecting means agrees with a preset value;

command outputting means for outputting an automatic tuning command when the cylinder temperature detected by said temperature detecting means deviates from a temperature range defined by predetermined upper and lower limits at a beginning of each injection molding cycle; and PID parameter adjusting means provided on said temperature regulator, for automatically tuning the PID parameters in response to the automatic tuning command from said command outputting means.

2. A temperature controller for an injection molding machine according to claim 1, wherein said injection cylinder has an injection nozzle at the front portion thereof, and said temperature detecting means detects a temperature of said injection nozzle.

3. A temperature controller for an injection molding machine according to claim 2, wherein said command outputting means outputs the automatic tuning command when the temperature of said injection nozzle detected by said temperature detecting means deviates from a temperature range defined by the predetermined upper and lower limits.

4. A temperature controller for an injection molding machine according to claim 1, wherein a plurality of sets of said heater and said temperature detecting means are provided along a longitudinal direction of said injection cylinder, and a plurality of said temperature regulators are provided along the longitudinal direction of said injection cylinder, each associated with a respective set of said heater and said temperature detecting means.

5. A temperature controller for an injection molding machine according to claim 1, wherein each temperature detecting means comprises a band heater and a thermocouple.

* * * * *